US012649495B2

(12) United States Patent
Hayakawa et al.

(10) Patent No.: US 12,649,495 B2
(45) Date of Patent: Jun. 9, 2026

(54) DRIVE CONTROL METHOD AND DRIVE CONTROL DEVICE

(71) Applicant: Nissan Motor Co., Ltd., Yokohama (JP)

(72) Inventors: Yasuhisa Hayakawa, Kanagawa (JP); Fuminori Takeda, Kanagawa (JP); Yoshiya Kusatomi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 407 days.

(21) Appl. No.: 17/780,065

(22) PCT Filed: Nov. 28, 2019

(86) PCT No.: PCT/JP2019/046619
§ 371 (c)(1),
(2) Date: May 26, 2022

(87) PCT Pub. No.: WO2021/106159
PCT Pub. Date: Jun. 3, 2021

(65) Prior Publication Data
US 2023/0339515 A1     Oct. 26, 2023

(51) Int. Cl.
*B60W 60/00* (2020.01)
*B60W 30/165* (2020.01)
(Continued)

(52) U.S. Cl.
CPC ........ *B60W 60/005* (2020.02); *B60W 30/165* (2013.01); *B60W 30/18163* (2013.01);
(Continued)

(58) Field of Classification Search
CPC ............. B60W 60/005; B60W 30/165; B60W 30/18163; B60W 30/182; B60W 40/105;
(Continued)

(56) References Cited

U.S. PATENT DOCUMENTS

2018/0065630 A1    3/2018  Tamura
2018/0257648 A1*   9/2018  Shunsuke ............. B60W 10/04
(Continued)

FOREIGN PATENT DOCUMENTS

CN        106467106 A      3/2017
GB          2572207 A      9/2019
(Continued)

OTHER PUBLICATIONS

Office Action of Feb. 19, 2025 of corresponding Mexican Patent Application No. MX/a/2022/006262.
Chinese Office Action of Nov. 22, 2024 of corresponding Chinese Patent Application No. 201980102605.2.

*Primary Examiner* — Rachid Bendidi
*Assistant Examiner* — Kirsten Jade M Santos
(74) *Attorney, Agent, or Firm* — Spencer Fane LLP

(57)     ABSTRACT

In a drive control method for using a drive control device to control the operation of a host vehicle using at least two autonomous driving modes that have different levels of driving assistance. The drive control method includes shifting the autonomous driving mode from a first mode to a second mode in which the driving assistance level of the second mode is higher than the driving assistance level of the first mode upon detecting a preceding vehicle in front of a host vehicle while traveling in the first mode. In this drive control method, a detectable distance to the preceding vehicle for shifting to the second mode is greater than a followable distance to the preceding vehicle when following travel is permitted in the first mode.

13 Claims, 7 Drawing Sheets

(51) Int. Cl.
  *B60W 30/18*     (2012.01)
  *B60W 30/182*    (2020.01)
  *B60W 40/105*    (2012.01)

(52) U.S. Cl.
  CPC ........ *B60W 30/182* (2013.01); *B60W 40/105* (2013.01); *B60W 2554/4026* (2020.02); *B60W 2554/4046* (2020.02); *B60W 2554/80* (2020.02); *B60W 2556/10* (2020.02); *B60W 2556/20* (2020.02); *B60W 2556/65* (2020.02)

(58) Field of Classification Search
  CPC ............ B60W 2554/4026; B60W 2554/4046; B60W 2554/80; B60W 2556/10; B60W 2556/20; B60W 2556/65; B60W 2554/801; B60W 30/16; B60W 50/082; B60W 60/0027; G08G 1/166; G08G 1/167
  See application file for complete search history.

(56)            References Cited

U.S. PATENT DOCUMENTS

| 2018/0345988 | A1 |   | 12/2018 | Mimura et al. |
| 2019/0311207 | A1 |   | 10/2019 | Oniwa et al. |

FOREIGN PATENT DOCUMENTS

| JP | 11-353599    | A |   | 12/1999 |              |
| JP | 2001-341548  | A |   | 12/2001 |              |
| JP | 2015058920   | A | * | 3/2015  | ............. B60K 31/00 |
| JP | 2018-39284   | A |   | 3/2018  |              |
| JP | 2019-107996  | A |   | 7/2019  |              |
| JP | 2019125384   | A | * | 7/2019  | ......... B60W 30/165 |
| WO | 2018/055773  | A1 |  | 3/2018  |              |
| WO | 2019/003294  | A1 |  | 1/2019  |              |

* cited by examiner

DRIVE CONTROL METHOD AND DRIVE CONTROL DEVICE

CROSS-REFERENCE TO RELATED APPLICATIONS

This application is a U.S. national stage application of International Application No. PCT/JP2019/046619, filed on Nov. 28, 2019.

BACKGROUND

Technical Field

The present invention relates to a drive control method and a drive control device.

Background Information

Autonomous driving modes set by a vehicle control device disclosed in International Publication No. 2019/003294 (Patent Document 1) include a first level, and a second level, in which the degree of driver intervention is less than that of the first level. In the vehicle travel control device of Patent Document 1, if the travel environment when controlling the operation of a vehicle in the second level autonomous driving mode is determined to be a prescribed travel environment, such as traveling on a low μ road due to snow or freezing, the autonomous driving mode is shifted to the first level.

SUMMARY

However, in the vehicle control device of Patent Document 1, there is the problem that the autonomous driving assistance level must be decreased from the second level to the first level in accordance with changes in the travel environment.

The problem to be solved by the present invention is that of providing a drive control method and a drive control device that can create many environments in which a host vehicle can be made to travel at a relatively high level of driving assistance.

In the drive control method and drive control device according to the present invention, when a preceding vehicle is detected in front of the host vehicle, an autonomous driving mode is changed to a mode in which the driving assistance level is relatively high, thereby solving the problem described above.

According to the present invention, since a host vehicle that follows a preceding vehicle travels on a route already passed through by the preceding vehicle, it is possible to create many environments in which the host vehicle may travel in an autonomous driving mode with a relatively high level of driving assistance.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below with reference to the drawings.

First Embodiment

Figure 1:
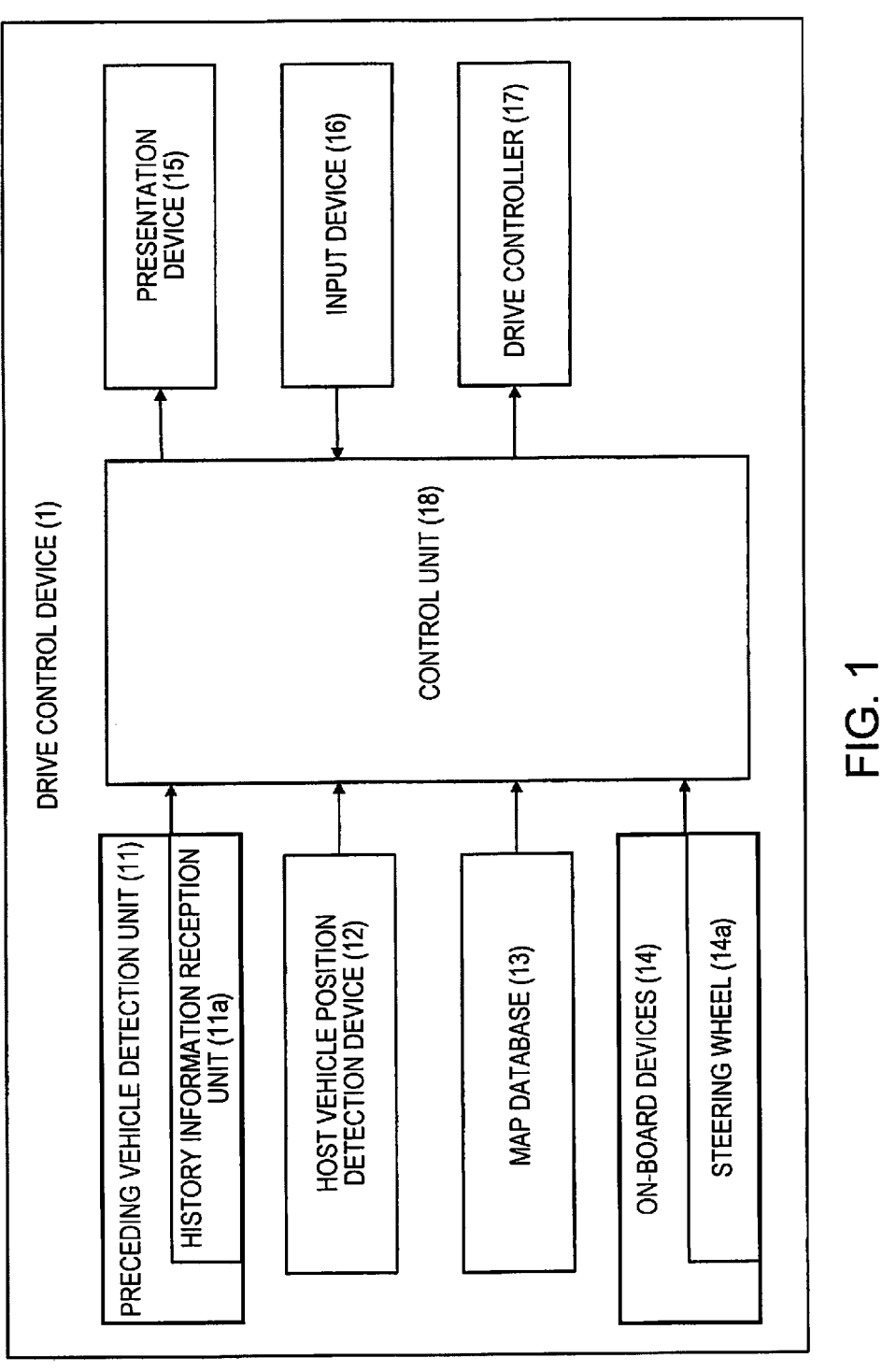
FIG. 1 is a block diagram illustrating a configuration of the drive control device according to a first embodiment of the present invention.

The first embodiment will be described with reference to FIGS. 1-4. FIG. 1 is a block diagram illustrating the configuration of a drive control device 1 according to the present embodiment. The drive control device 1 according to the present embodiment is also one embodiment for executing the drive control method according to the present invention. As shown in FIG. 1, the drive control device 1 of a vehicle according to the present embodiment comprises a preceding vehicle detection unit 11, a host vehicle position detection device 12, a map database 13, on-board devices 14, a presentation device 15, an input device 16, a drive controller 17, and a control unit 18. These devices are connected, for example, to a CAN (Controller Area Network) and other on-board LANs to mutually send and receive information.

The preceding vehicle detection unit 11 detects a preceding vehicle, that is, a vehicle traveling in front of a host vehicle. The preceding vehicle detection unit 11 has a front camera that photographs the front of the host vehicle, and/or a front radar that detects preceding vehicles and obstacle in front of the host vehicle. Further, the preceding vehicle detection unit 11 has a history information reception unit 11a that can receive travel history information about another vehicles. The detection result of the preceding vehicle detection unit 11 is output to the control unit 18 at prescribed time intervals.

The host vehicle position detection device 12 includes a GPS unit, a gyro sensor, a vehicle speed sensor, and the like. The host vehicle position detection device 12 detects radio waves transmitted from a plurality of communications satellites by means of the GPS unit, periodically acquires position information concerning a target vehicle (host vehicle), and detects the current location of the target vehicle based on the acquired position information about the target vehicle, angle change information acquired from the gyro sensor, and vehicle speed acquired from the vehicle speed sensor. The position information about the target vehicle detected by the host vehicle position detection device 12 is output to the control unit 18 at prescribed time intervals.

The map database 13 is memory for the storage of high-precision three-dimensional map information that includes the location information concerning various facilities and specific points, and that is configured to be capable of being accessed from the control unit 18. The map database 13 stores high-precision digital map information (high-precision map, dynamic map). In the present example, the stored high-precision map information is three-dimensional map information that includes ride height information detected by means of a data acquisition vehicle traveling over actual roads. The high-precision map information includes identification information about numerous lanes on roads. The map information of the map database 13 includes three-dimensional position information in regard to highways and/or curved lane roads as well as the size of the curves (for example, the curvature or the radius of curvature), merge points, branch points, and lane reduction locations. The high-precision map information also includes information relating to facilities, such as service areas and parking areas.

The on-board devices 14 are mounted in the vehicle and function by means of driver operations. The on-board devices 14 include a steering wheel 14a. Further, examples of the other on-board devices 14 include an accelerator pedal, a brake pedal, a navigation device, a turn signal indicator, wipers, lights, horns, and other specific switches. When the driver operates the on-board devices 14, the information is output to the control unit 18.

The presentation device 15 is a device such as a display provided in a navigation device, a display incorporated in a rem-view mirror, a display incorporated in a meter unit, a head-up display projected onto a windshield, a speaker provided in an audio device, a seat device in which a vibrating body is embedded. The presentation device 15 notifies the driver of lane change information and presentation information, described further below, in accordance with the control of the control unit 18.

The input device 16 is a device such as a button switch to which input by means of the driver's manual operation is possible, a touch panel arranged on a display screen, or a microphone to which input by means of the driver's voice is possible.

The drive controller 17 controls the operation of the host vehicle. For example, the drive controller 17 controls the braking operation as well as the operation of a drive mechanism for adjusting the acceleration/deceleration and the vehicle speed (including the operation of an internal combustion engine in a vehicle with an engine and the operation of a travel motor in an electric vehicle system, and including torque distribution between an internal combustion engine and a travel motor in a hybrid vehicle) by means of an autonomous speed control function. Further, the drive controller 17 controls the operation of a steering actuator by means of an autonomous steering control function, thereby executing the steering control of the host vehicle. For example, the drive controller 17 detects lane markers of the lane in which the host vehicle travels and controls the travel position (lateral position) of the host vehicle in the widthwise direction, so that the host vehicle travels in the center of the lane. Further, the drive controller 17 controls changes in the travel direction, the overtaking of a vehicle traveling ahead of the host vehicle, and the like. Further, the drive controller 17 carries out travel control for turning left or right at an intersection, or the like. Further, other known methods may be used as the travel control method carried out by the drive controller 17.

The control unit 18 is composed of a ROM (Read-Only Memory) in which is stored a program for controlling the operation of the host vehicle, a CPU (Central Processing Unit) that executes the program stored in this ROM, and a RAM (Random-Access Memory) that functions as an accessible storage device. In terms of the operating circuit, an MPU (Micro Processing Unit), a DSP (Digital Signal Processor), an ASIC (Application-Specific Integrated Circuit), a FPGA (Field Programmable Gate Array), etc., may be used in place of, or in addition to, the CPU (Central Processing Unit).

The control unit 18 acquires travel information relating to the travel state of the host vehicle. For example, the control unit 18 acquires, as travel information, image information exterior to the vehicle captured by a front camera and a rear camera, as well as detection results of a front radar, a rear radar, and side radars. Further, the control unit 18 also acquires, as travel information, vehicle speed information about the host vehicle detected by the vehicle speed sensor and image information of the driver's face captured by an on-board camera.

Further, the control unit 18 acquires, as travel information from the host vehicle position detection device 12, information regarding the current location of the host vehicle. Further, the control unit 18 acquires, as travel information from the map database 13, location information such as curved roads and the size of curves (for example, the curvature or the radius of curvature) merge points, branch points, toll booths, lane reduction locations, service areas (SA)/parking areas (PA), and the like. Further, the control unit 18 acquires, as travel information from the on-board devices 14, information regarding driver operation of the on-board devices 14.

Further, the control unit 18 executes a program stored in ROM by means of the CPU, thereby autonomously controlling the vehicle speed and steering of the host vehicle by means of the autonomous travel control function. The control unit 18 transmits to the drive controller 17 control instructions based on the autonomous travel control function.

The control unit 18 can set an autonomous driving mode in accordance with the driving assistance level, and assist the travel of the host vehicle by means of the set autonomous driving mode. The driving assistance level indicates the degree of intervention when the drive control device 1 assists the driving of the vehicle by means of the autonomous travel control function. The driver's contribution to the driving of the vehicle decreases as the driving assistance level increases. Specifically, the driving assistance level can be set using the definitions, etc., based on SAE J3016 of the US Society of Automotive Engineers (SAE). In the driving assistance level 0, all of the driving operations of the host vehicle are carried out manually by the driver. In the driving assistance level 1, although the driving operations of the host vehicle are primarily carried out by means of manual driver operations, the drive controller 17 appropriately supports the manual operations of the driver by means of any of the functions, such as automatic braking, following, a lane-keeping, etc. In the driving assistance level 2, although the driving operations of the host vehicle are primarily carried out by means of manual driver operations, under specific conditions, the drive controller 17 can combine a plurality of functions from among the automatic brake function, following function, lane keeping function, etc., thereby executing the driving assistance function. In the driving assistance level 3, the drive controller 17 executes all of the driving tasks, but the driver must resume control and be prepared to drive manually when requested by the drive control device 1. In the driving assistance level 4, under specific conditions, manual driving by the driver is not required, and the drive controller 17 can execute all of the driving tasks and monitor the surrounding conditions of the host vehicle. In the driving assistance level 5, the drive controller 17 can execute all of the driving tasks under all conditions. The classification of driving assistance levels is not limited to the classification according to the definitions of the US Society of Automotive Engineers and may be defined based on ISO/TC204 of the International Organization for Standardization (ISO). Further, the classification of the driving assistance levels may be defined by other criteria as long as it is appropriately classified in accordance with the degree of intervention of the drive control device 1.

As autonomous driving modes, the control unit 18 can set a first mode that corresponds to the driving assistance level 2 and a second mode that corresponds to the driving assistance level 3. If the autonomous driving mode is set to the first mode, the driver must visually monitor the surrounding conditions of the host vehicle. Further, the first mode is a hands-on mode. The hands-on mode is a mode in which autonomous steering control by the control unit 18 does not operate when the driver is not holding the steering wheel 14*a*. Whether the driver is holding the steering wheel 14*a* is detected by a steering torque sensor (not shown) of the EPS or by a touch sensor (not shown) provided on the steering wheel 14*a*. "Driver holding the steering wheel 14*a*" is not limited to a state in which the driver is firmly gripping the steering wheel 14*a*, but also includes a state in which the driver is lightly touching the steering wheel 14*a*.

If the autonomous driving mode is set to the second mode, on the other hand, the system of the drive control device 1 monitors the surrounding conditions of the host vehicle using a camera, a radar, or the like. That is, if the autonomous driving mode is set to the second mode, the travel environment around the host vehicle is automatically monitored by the system of the drive control device 1. Further, the second mode is a hands-off mode. The hands-off mode is a mode in which steering control by the control unit 18 operates even if the driver's hands leave the steering wheel 14*a*. The steering control by the control unit 18 is executed via the drive controller 17, as described above.

The relationship between the first mode and the second mode may be any relationship as long as the driving assistance level of the second mode is at a higher level of support than the first mode, and the driving assistance level corresponding to each autonomous driving mode is not limited to the driving assistance level 2 and the driving assistance level 3. Further, besides the first mode and the second mode, other autonomous driving modes which correspond to different driving assistance levels can be set by the control unit 18. In the present embodiment, a mode having a lower driving assistance level than the first mode may be provided, and a mode having a driving assistance level higher than the second mode may be provided. One or a plurality of modes having a driving assistance level higher than the first mode and lower than the second mode may be set between the first mode and the second mode.

Although not particularly limited, the drive control device 1 of the present embodiment executes an autonomous driving function that can switch the autonomous driving mode between the hands-on mode of the first mode and the hands-off mode of the second mode. Of the autonomous driving functions, switching of the hands-on mode and the hands-off mode is effectively utilized by the autonomous steering control function. The autonomous steering control function is for executing steering control of the host vehicle by controlling the operation of the steering actuator, thereby assisting the driver's operation of the steering wheel. This autonomous steering control function includes, for example, a lane-centering function that controls the steering so as to maintain the vehicle approximately in the center of the lane, a lane-keeping function for controlling the lateral position of the vehicle so as to travel in the same lane, a lane-change assist function for moving from the driving lane to another lane, an overtaking assist function for moving forward by passing next to another vehicle (in an adjacent lane) that is traveling ahead and, and a route travel assist function for autonomously changing lanes to follow a route to a destination. Although not particularly limited, the drive control device 1 of the present embodiment executes the autonomous steering control function described above in hands-off mode when any one or all of the following conditions are met. That is, when some or all of the following conditions are satisfied, the autonomous steering function can be executed in the hands-off mode of the second mode, that is, even if the driver's hands leave the steering wheel.

As one example, conditions for shifting to the hands-off mode in the lane-centering function are shown below.

The host vehicle is traveling on an automobile-dedicated road.

The vehicle is traveling on a road structurally separated from the opposing lane.

The vehicle is traveling on a road for which a high-precision map is in place and for which using high-precision map information is effective.

The vehicle is traveling at a vehicle speed less than or equal to the speed limit.

The vehicle is traveling on a road with a speed limit that is greater than or equal to a prescribed speed (for example, 60 km/h).

Global Navigational Satellite System: GNSS signals are effective.

A driver monitoring camera recognizes the driver, and it is detected that the driver is looking ahead.

The driver is facing forward.

It has been confirmed that there are no toll booths, motorway exits, merging points, intersections, or lane reduction points in the vicinity of the current location (for example, within about 800 m ahead).

There are no sharp curves of 100 R or less in the vicinity of the current location (for example, within about 500 m ahead).

The accelerator pedal is not depressed.

No abnormality has been detected in any of the radar, sonar, vehicle periphery monitoring camera, and the driver monitoring camera.

If any one of the above-described conditions is not satisfied during execution of the lane-centering function using the hands-off mode, a switch to the lane-centering function by means of the hands-on mode is executed. The conditions under which the hands-off mode, which is the second mode, is permitted can be defined for each autonomous driving function (lane-keeping function, lane-change assist function, overtaking assist function, or route travel assist function). Of course, it is a prerequisite that the conditions for activating the autonomous driving functions be met.

Next, the procedure of the drive control method carried out by the drive control device 1 will be described with reference to FIGS. 2 and 3. FIG. 3 shows the host vehicle 10 traveling on a first lane 31 and a preceding vehicle 21 traveling in front of the host vehicle 10.

Figure 2:
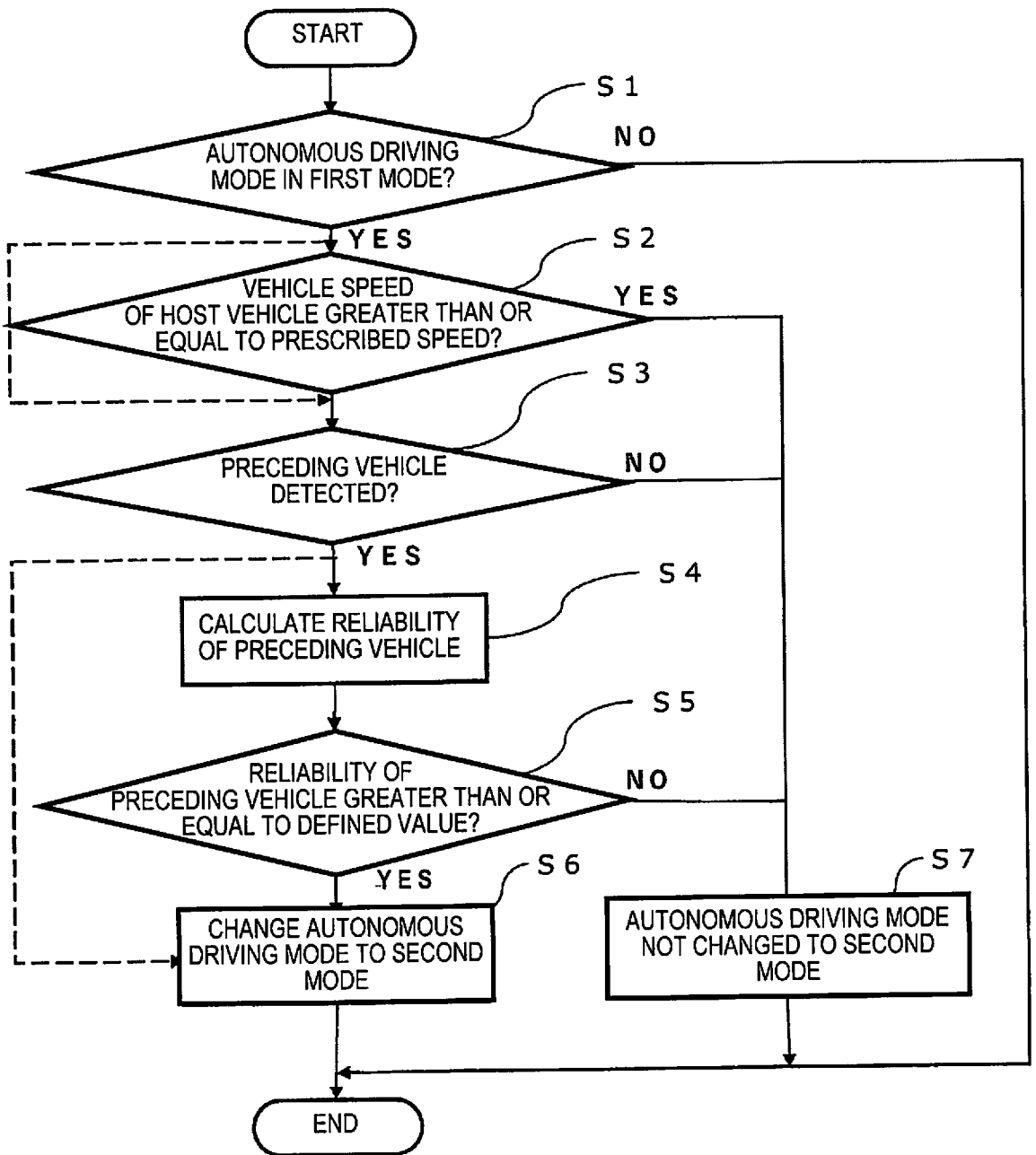
FIG. 2 is a flowchart showing the procedure of a drive control method carried out by the drive control device shown in FIG. 1.
Figure 3:
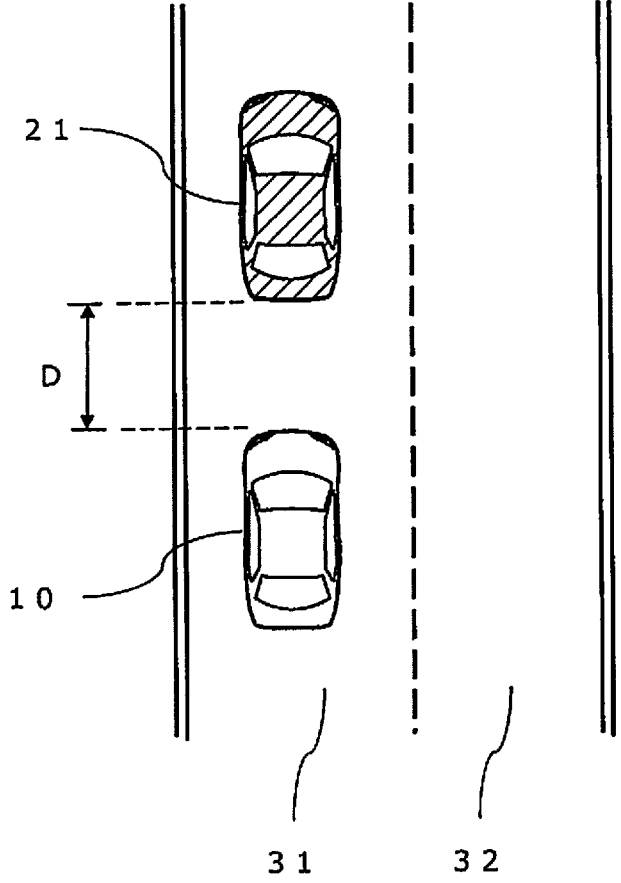
FIG. 3 is a diagram showing an example of a positional relationship between a host vehicle and a preceding vehicle in the drive control method shown in FIG. 2.

As shown in FIG. 2, in Step S1, the drive control device 1 determines whether the autonomous driving mode of the host vehicle 10 is the first mode. If the autonomous driving mode of the host vehicle 10 is not the first mode, the present control is ended.

On the other hand, if the autonomous driving mode of the host vehicle 10 is the first mode, control transitions to Step S2. In Step S2, the drive control device 1 determines whether the vehicle speed of the host vehicle 10 is greater than or equal to a prescribed speed. If the vehicle speed of the host vehicle 10 is greater than or equal to the prescribed speed, the autonomous driving mode is not changed, and the control is ended. The prescribed speed is an upper limit speed at which it is presumed that the drive control device 1 or the driver can promptly respond even when the preceding vehicle 21 suddenly decelerates or stops abruptly when the autonomous driving mode of the host vehicle 10 is set to the second mode. The prescribed speed can be set experimentally. The "prescribed speed" in this case is a speed of 100-130 km/h, and can be defined in accordance with the performance, etc., of the host vehicle 10. If it is determined that the autonomous driving mode of the host vehicle 10 is the first mode in Step S1, the process may transition to Step S3, described below, without going through Step S2, as indicated by the broken line in FIG. 2.

If it is determined that the vehicle speed of the host vehicle 10 is less than the prescribed speed in Step S2, control transitions to Step S3. In Step S3, the drive control device 1 determines whether the preceding vehicle detection unit 11 has detected the preceding vehicle 21 traveling in front of the host vehicle 10. That is, the drive control device 1 determines whether the preceding vehicle 21 traveling in front of the host vehicle 10 has been detected. The preceding vehicle detection unit 11 detects the presence of the preceding vehicle 21 based on image information captured by a front camera or the detection result of a front radar. The preceding vehicle 21 is a vehicle traveling immediately in front of the host vehicle 10. Further, the history information reception unit 11a of the preceding vehicle detection unit 11 receives travel history information about other vehicles by means of vehicle-to-vehicle communication, road-to-vehicle communication, or other infrastructure information communication means. The travel history information associates the locations and times of the passing of other vehicles. The travel history information may be collected at a prescribed cycle, collected in accordance with the transmission from another vehicle, or collected by limiting the range of positions. Then, if the travel history information includes information indicating that another vehicle was traveling at a point in front of the host vehicle 10 at a prescribed time prior (for example, within a prescribed period of time from the current time), the presence of another vehicle traveling in front of the host vehicle 10, i.e., the preceding vehicle 21, is detected. If the presence of the preceding vehicle 21 is not detected in front of the host vehicle 10, control transitions to Step S7. Then, in Step S7, the drive control device 1 executes a control that does not shift the autonomous driving mode to the second mode. Controls that do not shift the autonomous driving mode to the second mode include a control that keeps the autonomous driving mode in the first mode and a control that changes the autonomous driving mode to another mode in which the driving assistance level is lower than that of the first mode. Here, "another mode in which the driving assistance level is lower than that of the first mode" is, for example, a third mode in which only some of the driving operations are executed. The prescribed period of time is, for example, five seconds, but no limitation is imposed thereby, and may be a period of time having a length of several seconds to several tens of seconds. This prescribed period of time is preferably within one minute.

Further, the "preceding vehicle 21 traveling in front of the host vehicle 10" is not limited to another vehicle traveling ahead of the host vehicle 10 in the first lane 31 in which the host vehicle 10 is currently traveling. That is, the preceding vehicle 21 may be another vehicle traveling in a lane in which the host vehicle 10 is scheduled to travel in the future. For example, in the case that the host vehicle 10 is scheduled to change lanes after a few seconds along a preset planned travel route, if another vehicle is present in a second lane 32 which is the destination of the lane change, this other vehicle can be detected as the "preceding vehicle 21 traveling in front of the host vehicle 10." Further, in the case that the host vehicle 10 is scheduled to make a right or left turn at a branched road or an intersection after a few seconds, if there is another vehicle at the right turn or left turn destination, this other vehicle can be detected as the "preceding vehicle 21 traveling in front of the host vehicle 10."

The upper limit distance of a detectable distance D from the host vehicle 10 to the preceding vehicle 21 is greater than the upper limit distance of a followable distance from the host vehicle 10 to the preceding vehicle 21 when an operation to follow the preceding vehicle 21 is executed using the first mode. If a following operation is executed using the first mode with a relatively low driving assistance level, the upper limit distance of the followable distance is set with the aim of operating the host vehicle 10 so as to be linked to the movement of the preceding vehicle 21. On the other hand, in the present embodiment, the upper limit distance of the detectable distance D to the preceding vehicle 21 is set with the aim of confirming that there are no obstacles over a route (lane) that the host vehicle 10 traveling behind the preceding vehicle 21 is to travel in the future. Due to this difference in purpose, the "upper limit distance of the detectable distance D to the preceding vehicle 21" as a condition for shifting to the second mode with a relatively high driving assistance level is set to be greater than the upper limit distance of the followable distance. Here, the "operation to follow the preceding vehicle 21 is executed" means that the drive control device 1 controls the operation of the host vehicle 10 so as to be linked to the movement of the preceding vehicle 21, and to control the vehicle speed of the host vehicle 10 such that the host vehicle 10 and the preceding vehicle 21 maintain a constant distance. On the other hand, "the host vehicle 10 traveling behind the preceding vehicle 21" means that the host vehicle 10 travels behind the preceding vehicle 21 over a travel route on which the preceding vehicle 21 has already traveled, regardless of the presence/absence of an operation to follow the preceding vehicle 21. That is, when the host vehicle 10 travels behind the preceding vehicle 21, an operation to follow the preceding vehicle 21 may or may not be executed.

Further, the upper limit distance of the followable distance can be set based on the distance at which the host vehicle 10 and the preceding vehicle 21 carries out vehicle-to-vehicle communication. For this reason, the upper limit distance of the detectable distance D from the host vehicle 10 to the preceding vehicle 21 that can be detected by the preceding vehicle detection unit 11 of the drive control device 1 can be set greater than the upper limit distance at which the host vehicle 10 and the preceding vehicle 21 can carry out vehicle-to-vehicle communication. The upper limit distance of the detectable distance D to the preceding vehicle 21 that can be detected by the preceding vehicle detection unit 11 is, for example, 100 m, but is not limited thereto. Further, the upper limit distance at which the host vehicle 10 and the preceding vehicle 21 can carry out vehicle-to-vehicle communication is, for example, 50 m, but is not limited thereto.

Next, if it is detected that the preceding vehicle 21 is in front of the host vehicle 10 in Step S3, the drive control device 1 calculates a confidence for the preceding vehicle 21 in Step S4. The reliability of the preceding vehicle 21 is a standard indicating the travel stability of the preceding vehicle 21. The reliability of the preceding vehicle 21 is calculated based on the behavior of the preceding vehicle 21. Specifically, the reliability of the preceding vehicle 21 is calculated based on at least one of the amount of lateral displacement of the preceding vehicle 21, the frequency of acceleration/deceleration, and the frequency of the illumination of the brake lights. The amount of lateral displacement of the preceding vehicle 21, the frequency of acceleration/deceleration, and the frequency of the illumination of the brake lights are respectively calculated as values at a prescribed time or a prescribed distance. The greater the amount of lateral displacement of the preceding vehicle 21, the greater the frequency of acceleration/deceleration, and the greater the frequency of the illumination of the brake lights, the greater the instability evaluation of travel of the preceding vehicle 21, and the lower the reliability. On the other hand, the smaller the relative amount of lateral displacement of the preceding vehicle 21, the lower the frequency of acceleration/deceleration, or the lower the frequency of the illumination of the brake lights, the greater the stability evaluation of the travel of the preceding vehicle 21, and the higher the reliability. The drive control device 1 may assign points to the amount of lateral displacement of the preceding vehicle 21, the frequency of acceleration/deceleration, and the frequency of the illumination of the brake lights, respectively, and calculate the reliability of the preceding vehicle 21 by totaling the points.

On the other hand, if the preceding vehicle 21 is not detected in front of the host vehicle 10 in Step S3, the control transitions to Step S7 and the drive control device 1 carries out a control that does not shift the autonomous driving mode to the second mode.

Further, if the preceding vehicle 21 is detected in front of the host vehicle 10 in Step S3, the control transitions to Step S6, as indicated by the broken line in FIG. 2, and the drive control device 1 may shift the autonomous driving mode from the first mode to the second mode. The drive control device 1 determines that it is highly probable that a route over which the preceding vehicle 21 has traveled can be traveled by the host vehicle 10 without encountering obstacles/interference, and that it is possible to increase the assist level of the autonomous driving. In the present embodiment, it is possible to use the condition that the preceding vehicle 21 is detected in front of the host vehicle 10, thereby again finding/creating an environment in which autonomous driving can be executed in a mode in which the assist level is relatively high. As a result, the drive control device 1 of the present embodiment can increase conditions under which the host vehicle 10 can be smoothly driven autonomously, in a state in which the driving assistance level is high, thereby reducing the burden on the driver.

Next, the drive control device 1 determines whether the reliability of the preceding vehicle 21 is greater than or equal to a predetermined defined value in Step S5. This defined value is the lower limit value of the reliability indicating that the travel of the preceding vehicle 21 is stable to the extent that it is possible for the host vehicle 10 to travel smoothly behind the preceding vehicle 21 in a state in which the autonomous driving mode is set to the second mode. If the reliability of the preceding vehicle 21 is determined to be less than the defined value, the control transitions to Step S7 and the drive control device 1 carries out a control that does not shift the autonomous driving mode to the second mode.

On the other hand, if the reliability of the preceding vehicle 21 is determined to be greater than or equal to the defined value in Step S5, the drive control device 1 shifts the autonomous driving mode from the first mode to the second mode in Step S6, and the control is ended.

As described above, in the drive control device 1 and the drive control method according to the present embodiment, in the case that the operation of the host vehicle 10 is controlled by means of the first mode, if the preceding vehicle detection unit 11 detects the presence of the preceding vehicle 21 traveling in front of the host vehicle 10, the autonomous driving mode is shifted from the first mode to the second mode. This is because the drive control device 1 determines that the appearance of interfering obstacles or hindrances is unlikely when the host vehicle 10 travels over a route on which the preceding vehicle 21 has already traveled, and is able to determine that it is possible to increase the driving assistance level of the autonomous driving. In this case, since the preceding vehicle 21 is traveling in front of the host vehicle 10, it can be assumed that the route over which the host vehicle 10 is scheduled to travel in the future does not have obstacles that hinder the travel of the host vehicle 10, construction areas that require lane changes, etc. Therefore, it can be expected that the host vehicle 10 can raise the driving assistance level of the autonomous driving mode and smoothly travel behind the preceding vehicle 21. That is, the drive control device 1 can increase conditions under which the host vehicle 10 can be smoothly driven in a state in which the driving assistance level of the autonomous driving mode is relatively high, thereby reducing the burden on the driver.

Further, if it is detected that the preceding vehicle 21 is present when the operation of the host vehicle 10 is controlled by means of the first mode, the drive control device 1 calculates the reliability of the preceding vehicle 21 based on the behavior of the preceding vehicle 21. Then, if the calculated reliability of the preceding vehicle 21 is less than the predetermined defined value, the drive control device 1 shifts the autonomous driving mode to the second mode. If the calculated reliability of the preceding vehicle 21 is greater than or equal to the predetermined defined value, the drive control device 1 then shifts the autonomous driving mode to the second mode. As a result, the host vehicle 10 can increase the driving assistance level of the autonomous driving mode and smoothly travel behind the preceding vehicle 21, which has high reliability, that is, stable behavior. Further, the drive control device 1 determines that the route traveled by the preceding vehicle 21, the reliability of which is greater than or equal to the defined value, is reliable. This is because the drive control device 1 determines that it is unlikely that obstacles or hindrances will appear when the host vehicle 10 travels over the route on which the preceding vehicle 21, having a reliability that is greater than or equal to the defined value, has traveled, and is able to determine that it is possible to increase the driving assistance level of the autonomous driving.

Further, if the calculated reliability of the preceding vehicle 21 is less than the predetermined defined value, the drive control device 1 does not shift the autonomous driving mode to the second mode and maintains the first mode. As a result, if the reliability of the preceding vehicle 21 is less than the defined value, the operation of the host vehicle 10 is controlled in a state in which the autonomous driving mode is kept in the first mode, such that even if a sudden failure/problem were to occur, it could be handled flexibly by means of the driver's manual driving operations.

Further, the drive control device 1 calculates the reliability of the preceding vehicle 21 based on at least one of the amount of lateral displacement of the preceding vehicle 21, the frequency of acceleration/deceleration, and the frequency of the illumination of the brake lights. As a result, the drive control device 1 can calculate the reliability of the preceding vehicle 21 based on specific behaviors of the preceding vehicle 21. Therefore, if the preceding vehicle 21 wanders to the left and right, accelerates frequently, or often repeats braking operations that cause frequent illumination of the brake lights, the reliability of the preceding vehicle 21 is determined to be low, and the drive control device 1 does not shift the autonomous driving mode to the second mode. On the other hand, if the reliability of the preceding vehicle 21 is high, the preceding vehicle 21 is traveling at almost a constant speed without wandering to the left and right of the center of the first lane 31, and the frequency of sudden braking is low, the host vehicle 10 can smoothly travel behind the preceding vehicle 21 in a state in which the autonomous driving mode is set to the second mode.

Further, the upper limit distance of a detectable distance D from the host vehicle 10 to the preceding vehicle 21 that can be detected by the drive control device 1 can be set greater than the upper limit distance of a followable distance from the host vehicle 10 to the preceding vehicle 21 when an operation to follow the preceding vehicle is executed using the first mode. Further, the upper limit distance of the detectable distance D from the host vehicle 10 to the preceding vehicle 21 that can be detected by the drive control device 1 can be set greater than the upper limit distance at which the host vehicle 10 and the preceding vehicle 21 can carry out vehicle-to-vehicle communication. As a result, even if the distance between the host vehicle 10 and the preceding vehicle 21 is great enough that the host vehicle 10 cannot follow the preceding vehicle 21, the drive control device 1 can shift the autonomous driving mode of the host vehicle 10 to the second mode and cause the host vehicle 10 to travel behind the preceding vehicle 21. That is, the host vehicle 10 can smoothly travel over a route which the preceding vehicle 21 has already traveled in a state in which the autonomous driving mode is set to the second mode, even without following the preceding vehicle 21, by traveling behind the detected preceding vehicle 21.

If the history information reception unit 11a receives travel history information about other vehicles and the travel history information includes information indicating that another vehicle was traveling at a point in front of the host vehicle within a prescribed period of time, the drive control device 1 detects the other vehicle as the preceding vehicle 21 traveling in front of the host vehicle 10. As a result, even if the preceding vehicle 21 cannot be detected by the front camera or the front radar, the drive control device 1 can detect the presence of the preceding vehicle 21 traveling in front of the host vehicle 10. Specifically, the history information reception unit 11a can detect that the preceding vehicle 21 is in the lane in which the host vehicle 10 is scheduled to travel, that is, the lane to which the host vehicle 10 will change, or lane into which a right turn will be made, or the lane into which a left turn will be made.

Further, when the operation of the host vehicle 10 is controlled by means of the first mode and the vehicle speed of the host vehicle 10 is greater than or equal to a prescribed speed, the drive control device 1 does not shift the autonomous driving mode to the second mode. As a result, the drive control device 1 can shift the autonomous driving mode from the first mode to the second mode only when the host vehicle 10 is traveling at a vehicle speed within a range in which it can smoothly travel in the second mode. That is, if the autonomous driving mode is set to the second mode and the host vehicle 10 is traveling at a high vehicle speed that is greater than or equal to a prescribed speed, it will be difficult for the drive control device 1 or the driver to immediately respond to sudden changes in circumstance such as the sudden stopping of the preceding vehicle 21, so that the drive control device 1 does not shift the autonomous driving mode to the second mode. The control that does not shift the autonomous driving mode to the second mode includes a control that keeps the autonomous driving mode in the first mode, and a control that changes the autonomous driving mode to another mode in which the driving assistance level is lower than that of the first mode.

Further, the first mode is an autonomous driving mode that is said to require the driver's visual monitoring of the surrounding conditions of the host vehicle 10, and the second mode is an autonomous driving mode in which the drive control device 1 executes monitoring of the surrounding conditions of the host vehicle. As a result, the drive control device 1 can shift the autonomous driving mode from the first mode to the second mode, thereby reducing the monitoring burden on the driver.

Further, the first mode is a hands-on mode in which steering control by the drive control device 1 does not operate when the driver is not holding the steering wheel 14a, and the second mode is a hands-off mode in which steering control by the drive control device 1 operates even if the driver's hands leave the steering wheel. As a result, the drive control device 1 can shift the autonomous driving mode from the first mode to the second mode, thereby reducing the operating burden on the driver.

In the present embodiment, the drive control device 1 may detect the preceding vehicle 21 in Step S3 of FIG. 2, without executing the process for calculating the reliability of the preceding vehicle 21, that is, Steps S4 and S5 of FIG. 2, and then transition the control to Step S6 to thereby shift the autonomous driving mode to the second mode. Further, if the preceding vehicle 21 cannot be detected in Step S3, the drive control device 1 may shift the control to Step S7 and prohibit the process for shifting the autonomous driving mode to the second mode from taking place. Further, the drive control device 1 may detect the preceding vehicle 21 in Step S3 of FIG. 2 and then shift the autonomous driving mode from the first mode to the second mode in Step S6. That is, the process may proceed from Step S1 to Step S3 without execution of the process of Step S2 shown in FIG. 2 (skip Step S2). Thereafter, as described above, the process may proceed to Step S6 without execution of the processes of Steps S4 and S5. Further, the preceding vehicle detection unit 11 of the drive control device 1 need not need include the history information reception unit 11a.

Further, in the present embodiment, after the autonomous driving mode shifts from the first mode to the second mode in Step S6 of FIG. 2, the host vehicle 10 travels behind the preceding vehicle 21. In this case, the host vehicle 10 may travel by following the preceding vehicle 21 so as to be linked to the movements of the preceding vehicle 21, or may simply travel along the travel route of the preceding vehicle 21 without following the preceding vehicle 21. Further, the upper limit distance of the detectable distance D from the host vehicle 10 to the preceding vehicle 21 that can be detected by the drive control device 1 may coincide with the upper limit distance at which the host vehicle 10 and the preceding vehicle 21 can carry out vehicle-to-vehicle communication.

Further, the drive control device 1 may estimate the ride height of other vehicles traveling in front of the host vehicle 10, and when the ride height of another vehicle is greater than the ride height of the host vehicle 10, the process to determine whether "the preceding vehicle 21 traveling in front of the host vehicle 10 has been detected" of Step S3 is not carried out, and process control goes to Step S7. That is, when the ride height of another vehicle traveling ahead is greater than the ride height of the host vehicle 10, the other vehicle is excluded as a "preceding vehicle 21." This is due to the fact that when it is assumed that there is a fallen object, etc., in the first lane 31, even if the object cannot be an obstacle that hinders the travel of the other vehicle with a high ride height, it could be an obstacle that hinders the travel of the host vehicle 10 with a lower ride height than that of the other vehicle. That is, the drive control device 1 takes into consideration the possibility that even if another vehicle with a high ride height has traveled on the route without hindrance, the route may hinder the host vehicle 10 with a relatively low ride height. If the host vehicle 10 is a passenger car, other vehicles with a greater ride height than that of the host vehicle 10 are, for example, large vehicles such as trucks. The host vehicle 10 identifies the vehicle type from other vehicle information obtained by means of vehicle-to-vehicle communication with the other vehicle traveling ahead, and estimates the ride height of the other vehicle based on the vehicle type. Further, the host vehicle 10 specifies the vehicle type of the other vehicle from the external shape or license plate information about the other vehicle, obtained from an image of the other vehicle traveling ahead captured by the front camera, and estimates the ride height of the other vehicle based on the vehicle type.

Further, when it is determined that the other vehicle traveling in front of the host vehicle 10 is a two-wheeled vehicle, the drive control device 1 may skip the process of determining whether "the preceding vehicle 21 traveling in front of the host vehicle 10 has been detected" of Step S3, and go to Step S7. That is, when the other vehicle traveling in front of the host vehicle is a two-wheeled vehicle, the other vehicle is excluded as a "preceding vehicle 21." This is due to the fact that when it is assumed that there is a fallen object, etc., in the first lane 31, even if the object cannot be an obstacle that hinders the travel of the other vehicle, which is a two-wheeled vehicle, depending on the size of the object, it could be an obstacle that hinders the travel of the host vehicle 10. That is, the drive control device 1 takes into consideration the possibility that even if the two-wheeled vehicle was able to travel on the route while avoiding obstacles, the route may have an obstacle that cannot be avoided by the host vehicle 10, which is a four-wheeled vehicle. Whether the other vehicle is a two-wheeled vehicle can be determined based on an image captured by the camera.

Second Embodiment

The second embodiment will be described with reference to FIGS. 4-7. The same reference numerals as those shown in FIGS. 1-3 indicate the same or similar constituent elements or control steps, so that redundant explanations are omitted and reference is made to the descriptions of the first embodiment.

Figure 5:
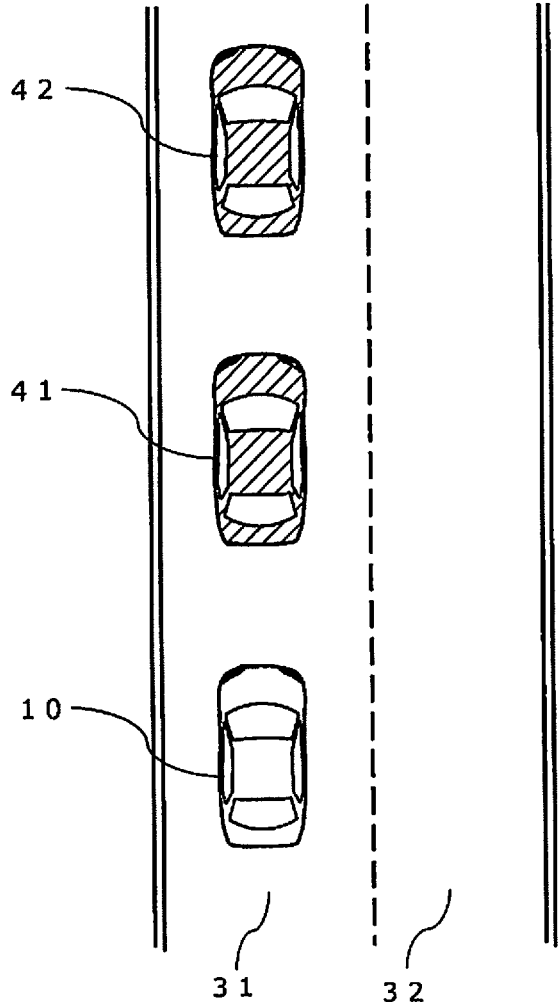
FIG. 5 is a diagram showing an example of a positional relationship between a host vehicle, a first preceding vehicle, and a second preceding vehicle in the drive control method shown in FIG. 4.
Figure 6:
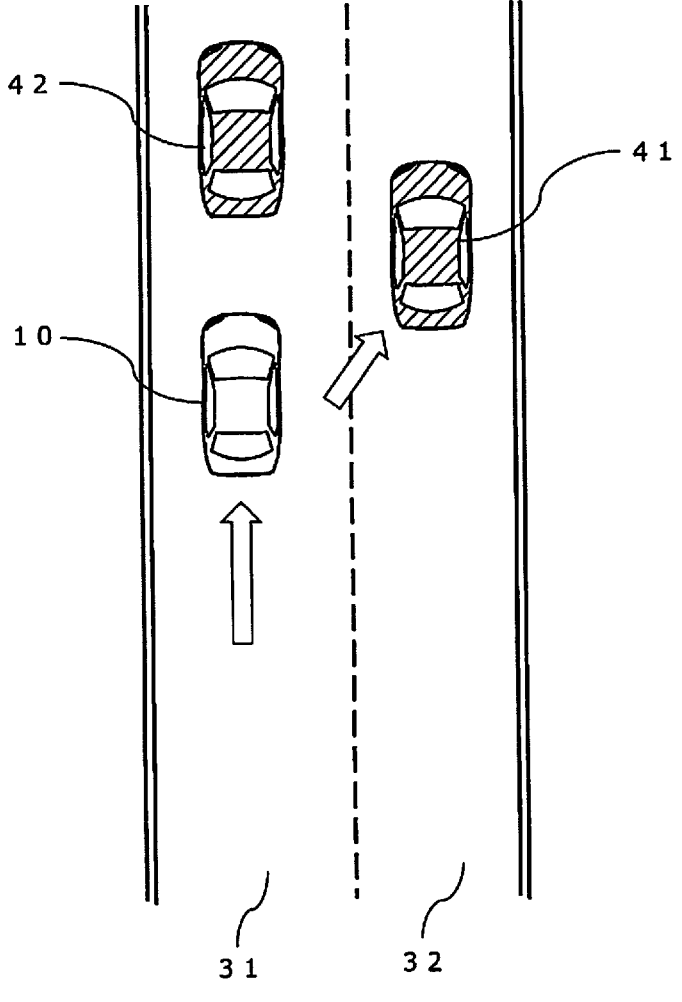
FIG. 6 is a diagram showing an example of a positional relationship among the host vehicle, a first preceding vehicle, and a second preceding vehicle when only the first preceding vehicle changes lanes in the drive control method shown in FIG. 4.
Figure 7:
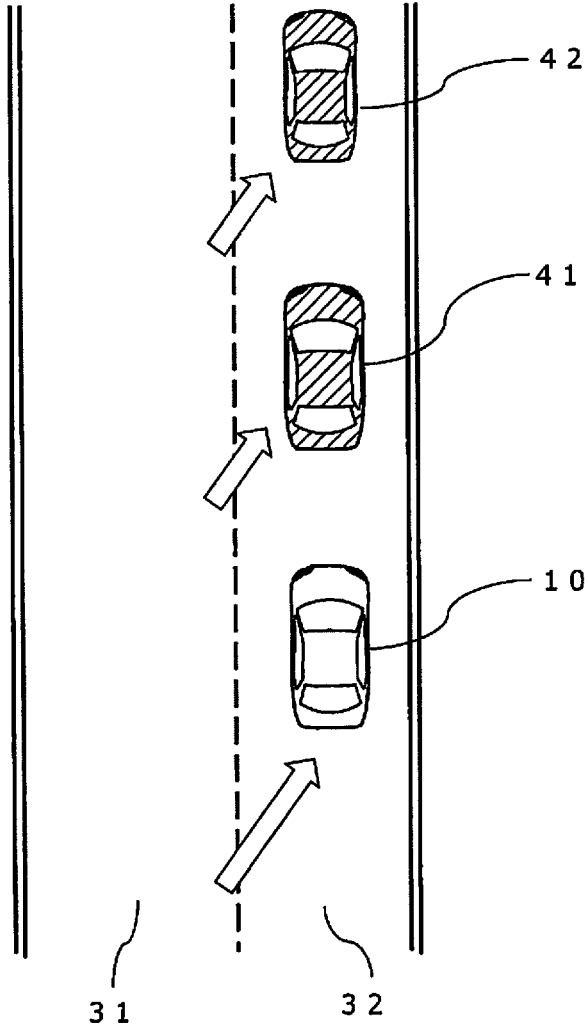
FIG. 7 is a diagram showing an example of a positional relationship among the host vehicle, a first preceding vehicle, and a second preceding vehicle when the first preceding vehicle and the second preceding vehicle change lanes in the drive control method shown in FIG. 4.

The procedure of the drive control method carried out by the drive control device 1 will be described with reference to FIGS. 4-7. FIGS. 5-7 show the host vehicle 10 traveling in the first lane 31, a first preceding vehicle 41 as a preceding vehicle traveling in front of the host vehicle 10, and a second preceding vehicle 42 traveling in front of the first preceding vehicle 41. The first preceding vehicle 41 is another vehicle traveling in the first lane 31 immediately in front of the host vehicle 10.

Figure 4:
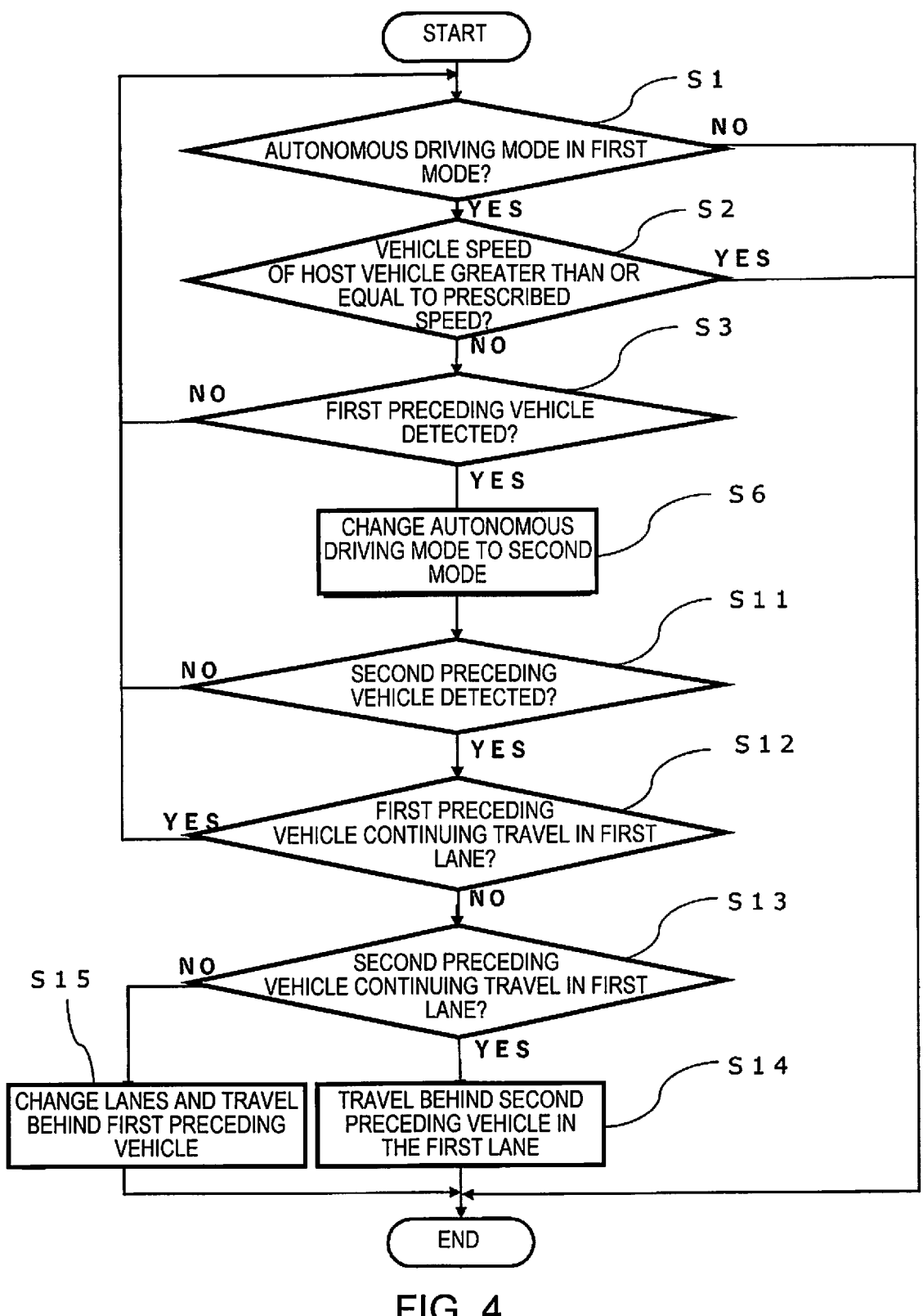
FIG. 4 is a flowchart illustrating the procedure of a drive control method carried out by the drive control device according to a second embodiment of the present invention.

FIG. 4 is a flowchart illustrating the control procedure of the second embodiment. As shown in FIG. 4, the drive control device 1 determines whether a first preceding vehicle 41, which is a preceding vehicle traveling in the first lane 31, is detected in Step S3. If a first preceding vehicle 41 is not detected, control returns to Step S1 and the processes after Step S1 are again executed. On the other hand, if a first preceding vehicle 41 is detected, the drive control device 1 shifts the autonomous driving mode from the first mode to the second mode in Step S6.

After shifting the autonomous driving mode to the second mode in Step S6, the drive control device 1 determines whether a second preceding vehicle 42 is detected in front of the first preceding vehicle 41 in the first lane, as shown in FIG. 5, in Step S11. If a second preceding vehicle 42 is not detected, control returns to Step S1 and the processes after Step S1 are again executed.

In Step S11, if a second preceding vehicle 42 is detected, control shifts to Step S12, and the drive control device 1 determines whether the first preceding vehicle 41 continues to travel in the first lane 31. If it is determined that the first preceding vehicle 41 continues to travel in the first lane 31 without changing lanes, control returns to Step S1 and the processes after Step S1 are repeated.

In Step S11, if it is determined that the first preceding vehicle 41 is not continuing its travel in the first lane 31, that is, as shown in FIGS. 6 and 7, if it is determined that the first preceding vehicle 41 has changed lanes to the second lane 32, which is another lane adjacent to the first lane 31, control shifts to Step S13. In Step S13, the drive control device 1 determines whether the second preceding vehicle 42 continues to travel in the first lane 31.

If it is determined that the second preceding vehicle 42 continues to travel in the first lane 31 without changing lanes in Step S13, control shifts to Step S14. In Step S14, the drive control device 1 causes the host vehicle 10 to travel behind the second preceding vehicle 42. In this case, as shown in FIG. 6, the host vehicle 10 reduces the inter-vehicular distance with respect to the second preceding vehicle 42 to a prescribed distance and follows the second preceding vehicle 42. Further, without being limited in this way, the host vehicle 10 may travel behind the second preceding vehicle 42 in the first lane 31 without following the second preceding vehicle 42, in a state in which the original inter-vehicular distance from the second preceding vehicle 42 (the inter-vehicular distance at the time that the first preceding vehicle 41 changes lanes) is maintained. That is, the host vehicle 10 may follow the second preceding vehicle 42 so as to be linked to the movements of the second preceding vehicle 42, or may simply travel along the travel route of the second preceding vehicle 42 without following the second preceding vehicle 42.

Further, in Step S13, if it is determined that the second preceding vehicle 42 does not continue to travel in the first lane 31, that is, if it is determined that the second preceding vehicle 42 has changed lanes to the second lane 32, control shifts to Step S15. In Step S15, the drive control device 1 causes the host vehicle 10 to change lanes to the second lane 32 while traveling behind the first preceding vehicle 41, such that the host vehicle 10 can change lanes following the first preceding vehicle 41 and the second preceding vehicle 42. Then, as shown in FIG. 7, the drive control device 1 causes the host vehicle 10 to travel behind the first preceding vehicle 41 in the second lane 32. In this case, the host vehicle 10 may follow the first preceding vehicle 41 so as to be linked to the movements of the first preceding vehicle 41, or may simply travel along the travel route of the first preceding vehicle 41 without following the first preceding vehicle 41.

As described above, in the drive control device 1 and the drive control method according to the present embodiment, a first preceding vehicle 41 and a second preceding vehicle 42 traveling in front of the first preceding vehicle 41 are detected in the first lane 31, and it is determined whether the first preceding vehicle 41 and the second preceding vehicle 42 continue to travel in the first lane 31. If it is determined that the first preceding vehicle 41 has changed lanes to the second lane 32 and that the second preceding vehicle 42 continues to travel in the first lane 31, the drive control device 1 causes the host vehicle 10 to travel behind the second preceding vehicle 42, in place of the process for causing the host vehicle 10 to travel behind the first preceding vehicle 41. Even when the first preceding vehicle 41 has changed lanes, if the second preceding vehicle 42 that was traveling in front of the first preceding vehicle 41 continues to travel in the same first lane 31 as the host vehicle 10, the drive control device 1 determines that, it is highly probable that travel can be continued in the first lane 31 without encountering obstacles. As a result, even if the first preceding vehicle 41 changes lanes, the host vehicle 10 can smoothly travel behind the second preceding vehicle 42 while maintaining the autonomous driving mode in the second mode.

Further, if it is determined that both the first preceding vehicle 41 and the second preceding vehicle 42 have changed lanes to the second lane 32, the drive control device 1 causes the host vehicle 10 to change lanes to the second lane 32, following the first preceding vehicle 41 and the second preceding vehicle 42. That is, the drive control device 1 causes the host vehicle 10 to travel behind the first preceding vehicle 41 and to execute a lane change to the second lane 32. This is due to the fact that if both the first preceding vehicle 41 and the second preceding vehicle 42 change lanes, there is a high probability that there is an obstacle or a construction area ahead in the first lane 31.

In the drive control method shown in FIG. 4, the drive control device 1 may calculate the reliability of the first preceding vehicle 41 and determine whether the reliability of the first preceding vehicle 41 is greater than or equal to a defined value, as indicated by Steps S4 and S5 of FIG. 2, between Step S3 and Step S6 of FIG. 4. Further, as indicated by Steps S12 and S13, respectively, of FIG. 4, after it is detected that the first preceding vehicle 41 has changed lanes and that the second preceding vehicle 42 continues to travel in the first lane 31, the drive control device 1 may calculate the reliability of the second preceding vehicle 42 and determine whether the reliability of the second preceding vehicle 42 is greater than or equal to a predetermined defined value. That is, if the reliability of the second preceding vehicle 42 is less than the defined value, the drive control device 1 can reduce the autonomous driving mode from the second mode to the first mode.

Further, in the drive control method according to the second embodiment, the first preceding vehicle 41 may be detected in Step S3 of FIG. 4, and the autonomous driving mode may then be shifted from the first mode to the second mode in Step S6, in the same manner as in the first embodiment. That is, Step S2 shown in FIG. 4 may be passed over.

The invention claimed is:

1. A drive control method having at least two autonomous driving modes having different driving assistance levels, the drive control method comprising executing the following using a drive control device including a processor:

controlling a host vehicle among the at least two autonomous driving modes, the at least two autonomous driving modes including a first mode and a second mode, the first mode having a first driving assistance level and being an autonomous driving mode that requires a driver to visually monitor surrounding conditions of the host vehicle, the second mode having a second driving assistance level higher than the first driving assistance level and being an autonomous driving mode in which the controller executes monitoring of the surrounding conditions of the host vehicle, controlling the host vehicle in the first mode when a preceding vehicle is not detected in front of the host vehicle, executing a following control using the first mode upon detecting a preceding vehicle traveling within a maximum followable distance in front of the host vehicle while the host vehicle is traveling in the first mode, shifting from the first mode to the second mode and causing the host vehicle to travel behind the preceding vehicle upon detecting the preceding vehicle traveling in front of the host vehicle is in the first mode and at a distance greater than the maximum followable distance and smaller than or equal to a maximum detectable distance, the maximum detectable distance being greater than the maximum followable distance.

2. The drive control method according to claim 1, further comprising calculating a reliability of the preceding vehicle using the drive control device based on a behavior of the preceding vehicle upon detecting the preceding vehicle while the operation of the host vehicle is controlled using the first mode, and the drive control device not shifting the autonomous driving mode to the second mode upon determining the reliability of the preceding vehicle is less than a predetermined defined value.

3. The drive control method according to claim 2, wherein the drive control device maintains the autonomous driving mode in the first mode upon determining the reliability of the preceding vehicle is less than the defined value.

4. The drive control method according to claim 2, wherein the calculating of the reliability of the preceding vehicle using the drive control device is based on at least one of a lateral displacement amount of the preceding vehicle, a frequency of acceleration or deceleration, and a frequency of an illumination of brake lights.

5. The drive control method according to claim 1, wherein the maximum followable distance is a maximum distance at which the host vehicle and the preceding vehicle can carry out vehicle-to-vehicle communication.

6. The drive control method according to claim 1, wherein the drive control device detects another vehicle as a preceding vehicle traveling in front of the host vehicle when travel history information about the other vehicle is received and the travel history information that is received includes information indicating that the other vehicle was traveling at a point in front of the host vehicle within a prescribed period of time.

7. The drive control method according to claim 1, wherein the drive control device does not shift the autonomous driving mode to the second mode when the host vehicle is traveling in the first mode and a vehicle speed of the host vehicle is greater than or equal to a prescribed speed.

8. A drive control method having at least two autonomous driving modes having different driving assistance levels, the drive control method comprising executing the following using a drive control device including a processor:

controlling a host vehicle among the at least two autonomous driving modes, the at least two autonomous driving modes including a first mode and a second mode, the first mode having a first driving assistance level and being a hands-on mode in which the controller does not execute an autonomous steering control when the driver is not holding the steering wheel, the second mode having a second driving assistance level higher than the first driving assistance level and being a hands-off mode in which the controller executes the autonomous steering control even if the driver's hands leave the steering wheel, controlling the host vehicle in the first mode when a preceding vehicle is not detected in front of the host vehicle, executing a following control using the first mode upon detecting a preceding vehicle traveling within a maximum followable distance in front of the host vehicle while the host vehicle is traveling in the first mode, shifting from the first mode to the second mode and causing the host vehicle to travel behind the preceding vehicle upon detecting the preceding vehicle traveling in front of the host vehicle at a distance greater than the maximum followable distance and smaller than or equal to a maximum detectable distance, the maximum detectable distance being greater than the maximum followable distance.

9. The drive control method according to claim 1, wherein another vehicle is excluded as a preceding vehicle when a ride height of the other vehicle traveling in front of the host vehicle is greater than a ride height of the host vehicle.

10. The drive control method according to claim 1, wherein another vehicle is excluded as a preceding vehicle when the other vehicle traveling in front of the host vehicle is a two-wheeled vehicle.

11. The drive control method according to claim 1, wherein the drive control device is configured to shift the autonomous driving mode from the first mode to the second mode when a first preceding vehicle is present as the preceding vehicle in a first lane in which the host vehicle travels while the operation of the host vehicle is controlled using the first mode, determine whether or not the first preceding vehicle and a second preceding vehicle are traveling in the first lane upon detecting a second preceding vehicle traveling in front of the first preceding vehicle is also present in the first lane, cause the host vehicle to travel behind the second preceding vehicle upon determining that the first preceding vehicle has changed lanes to another lane that is different from the first lane and that the second preceding vehicle continues to travel in the first lane, and cause the vehicle to travel behind the first preceding vehicle and to change lanes to the other lane upon determining that the first preceding vehicle and the second preceding vehicle changed lanes to the other lane.

12. A drive control device comprising:

a control unit configured to control an operation of a host vehicle using at least two autonomous driving modes including a first mode and a second mode, the first mode having a first driving assistance level and being an autonomous driving mode that requires a driver to visually monitor surrounding conditions of the host vehicle, and the second mode having a second driving assistance level that is higher than the first driving assistance level and being an autonomous driving mode in which the controller executes monitoring of the surrounding conditions of the host vehicle; and a preceding vehicle detection unit configured to detect whether there is a preceding vehicle traveling in front of the host vehicle, the control unit being configured control the host vehicle in the first mode when the preceding vehicle is not detected the control unit being configured to execute a following control using the first mode when the operation of the host vehicle is controlled using the first mode and the preceding vehicle detection unit detects the preceding vehicle at a distance within a maximum followable distance from the host vehicle, the control unit being configured to shift the autonomous driving mode from the first mode to the second mode and cause the host vehicle to travel behind the preceding vehicle when the operation of the host vehicle is controlled using the first mode and the preceding vehicle detection unit detects the preceding vehicle at a distance greater than the maximum followable distance and smaller than or equal to a maximum detectable distance from the host vehicle, the maximum detectable distance being greater than the maximum followable distance.

13. The drive control method according to claim 1, wherein the following control further includes controlling the host vehicle such that the host vehicle and the preceding vehicle maintain a constant following distance.

* * * * *